United States Patent [19]

Sonderegger

[11] 3,999,426
[45] Dec. 28, 1976

[54] TORQUE ANALYZING APPARATUS

[75] Inventor: John Robert Sonderegger, Houston, Tex.

[73] Assignee: Dresser Industries, Inc., Dallas, Tex.

[22] Filed: Dec. 4, 1975

[21] Appl. No.: 637,615

[52] U.S. Cl. .................................. 73/134; 73/1 C
[51] Int. Cl.² ........................................ G01L 25/00
[58] Field of Search ............................ 73/134, 1 C

[56] References Cited
UNITED STATES PATENTS

| 2,648,219 | 8/1953 | Emery | 73/1 C |
| 3,007,336 | 11/1961 | Livermont | 73/134 |
| 3,491,579 | 1/1970 | Able | 73/1 C |

Primary Examiner—Charles A. Ruehl
Attorney, Agent, or Firm—R. L. Van Winkle; J. N. Hazelwood

[57] ABSTRACT

Described herein is an improved torque analyzing apparatus for indicating the torque transmitted by power tools. In addition to the housing, bearing supports and torque indicator or pointer, the apparatus includes a torque input shaft that is frictionally connected with a torsion or spiral spring through a resilient sleeve on the shaft. The torsion spring is connected to and transmits torque to a spring housing which is connected to a torsion bar. The torque indicator or pointer is mounted on the spring housing. The torsion spring or spiral spring permits several rotations of the torque input shaft and provides a gradual increase in the torque that is applied to the torsion bar.

6 Claims, 2 Drawing Figures

TORQUE ANALYZING APPARATUS

BACKGROUND OF THE INVENTION

This invention relates generally to improved torque analyzing apparatus. More particularly, but not by way of limitation, this invention relates to improved torque analyzing apparatus having a torsion spring frictionally connected with a torque input shaft.

U.S. Pat. No. 3,007,336 issued Nov. 7, 1961 to F. W. Livermont, clearly describes the structure in operation of a similar torque analyzing apparatus. In the apparatus described in the patent, an elongated coil spring is utilized to permit the gradual increase in the torque as is applied to the torsion bar. While that apparatus functions satisfactorily, it has been found to require less space to utilize a spiral or torsion spring in lieu of the coil spring.

The use of the torsion spring has proved to be generally satisfactory, but difficulty has been encountered in connecting the torsion spring to the torque input shaft. In the past, a plurality of lugs have been formed on the exterior of the torque input shaft that project into holes formed in the innermost coil of the spring. In order to form the holes in the spring, it has been necessary to heat treat the spring thus destroying some of the spring characteristics. Attempts have been made to reheat the spring to restore its original characteristics without complete success. For the most part, the springs have deformed at the approximate location of the end of the heat treat so that the torque applied causes the holes in the spring to become disengaged from the lugs on the shaft or results in breakage of the spring in the end of the heat treat.

In the instances where the spring did not break, but simply became disengaged from the lugs, difficulty was encountered in maintaining the accuracy of the analyzer. On occasions, the lugs would re-enter the holes causing a lag in the operation of the analyzer, or in some instances, would not engage at all resulting in total inoperability of the analyzer.

Accordingly, an object of this invention is to provide an improved torque analyzer including means for effectively connecting the torsion spring with the torque input shaft to obviate the disadvantages mentioned hereinbefore.

SUMMARY OF THE INVENTION

This invention provides an improved torque analyzing apparatus, including a housing, a torque receiving member having a relatively free end and having a fixed end connected to the housing, torque indicating means responsive to movement of the free end of the torque receiving member to indicate the torque applied to the torque receiving member. The improvement comprises, in combination, a torque input shaft rotatably supported in the housing, a spring housing connected to the torque receiving member and encompassing a portion of the shaft, spring means operably disposed between the shaft and housing for transmitting torque from the shaft to the torque receiving member through the spring housing, and intermediate connection means for frictionally connecting the shaft to the spring means.

The foregoing object and advantages of the invention will become more apparent when the following detailed description is read in conjunction with the accompanying drawing.

DETAILED DESCRIPTION OF THE PREFERRED EMBODIMENT

Figure 1:
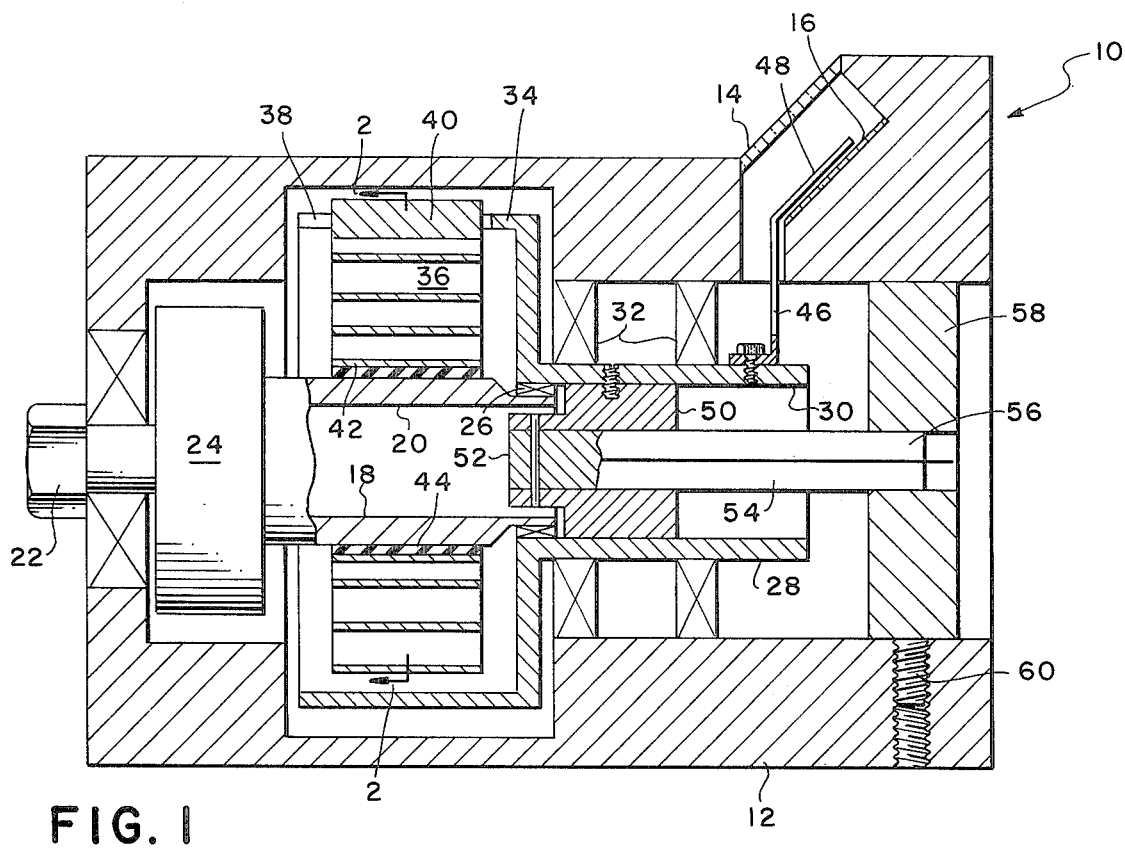
FIG. 1 is a cross-sectional view in elevation, of a torque analyzer constructed in accordance with the invention.
Figure 2:
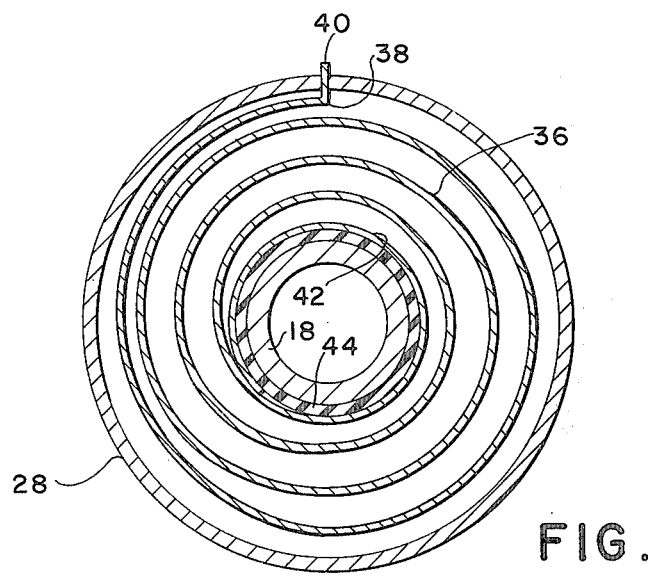
FIG. 2 is a transverse, cross-sectional view taken generally along the line 2—2 of FIG. 1.

Referring to the drawing and to FIG. 1 in particular, shown therein and generally designated by the reference character 10, is a torque analyzer constructed in accordance with the invention. The torque analyzer 10 includes a housing 12 that is more or less schematically illustrated in the drawing. A viewing window 14 of transparent material is located in the housing 12 so that the user of the analyzer 10 can view a graduated dial 16 which is also mounted in the housing 12.

Rotatably supported in the housing 12 is a torque input shaft 18 that is partially tubular in configuration as illustrated at 20. As viewed in FIG. 1, the leftmost end of the torque input shaft 18 is provided with a hex head 22 or other suitable configuration for receiving the output end of the power tool (not shown) which is to be analyzed.

A clutch mechanism 24 is operably disposed with respect to the input shaft 18 and functions in conjunction with a locking mechanism (not shown) to lock the torque into the analyzer 10 so that the torque indicated can be read by the user. The locking mechanism, which is well known, also includes a means for releasing the torque so that the analyzer returns to a zero reading in preparation for the next use thereof.

The other end of the torque input shaft 18 is journaled by bearings 26 in a hollow spring housing 28 so that the input shaft 18 and spring housing 28 are independently rotatable. It will be noted that the spring housing 28 includes a reduced end portion 30 that is journaled in the housing 12 by bearings 32.

An enlarged end 34 of the spring housing 28 encompasses a portion of the input shaft 18 and a torsion or spiral spring 36 that encircles a portion of the shaft 18. The spring housing 28 is provided in the enlarged portion 34 with a slot 38 for receiving outermost end 40 of the spring 36.

Disposed between an innermost coil 42 of the spring 36 and the torque input shaft 18 is a resilient sleeve 44. The sleeve 44 is preferably constructed from an elastomeric material such as neoprene which provides a frictional connection between the exterior of the torque input shaft 18 and the spring 36. It has been found that neoprene having a hardness of about 70 durometer is entirely satisfactory to provide the desired frictional connection.

In constructing the spring 36, the innermost coil 42 is formed with a diameter that is less than the outer diameter of the sleeve 44. When assembled on the sleeve 44, the innermost coil 42 attempts to return to its original size providing an initial compression on the sleeve 44 and, thus, providing a positive frictional engagement between the spring 36 and sleeve 44.

Near the smaller end 30 of the spring housing 28, a pointer or torque indicator 46 is mounted. An upper portion 48 of the indicator 46 is located over the dial 16 to indicate the torque applied to the analyzer 10.

Intermediate the enlarged end 34 and the small end 30 of the spring housing 28, an annular member 50 is located providing a connection between the spring housing 28 and a free end 52 of a torsion bar 54. The torsion bar 54 extends longitudinally through the housing 12 having an end 56 fixed in a calibration member 58 that is located in the housing 12. The calibration member 58 is in turn fixed to the housing 12 by a set screw 60 which can be loosened to permit axial movement of the calibration member 58 relative to the torsion bar 54 and thus change the torsion characteristics of the torsion bar 54.

OPERATION OF THE PREFERRED EMBODIMENT

In the operation of the analyzer 10, a power tool is connected to the hex head 22. The torque input shaft 18 is rotated thereby and, through the frictional connection provided by the sleeve 44, tightens the torsion spring 36. As the torsion spring 36 tightens in response to the rotation of the shaft 18, an even greater adhesion will occur between the innermost coil 42 of the spring 36 and the resilient sleeve 44. Also, as the tightening of the spring 36 occurs, force is transmitted through the end 40 thereof to the spring housing 28.

The spring housing 28 cannot rotate until sufficient force is exerted on the spring housing 28 to impose a twist in the torsion bar 54. Until such force is attained, the housing 28 remains relatively stationary and little or no movement occurs. When the power tool does exert sufficient force on the shaft 18 to cause a partial rotation of the housing 28, the indicator or pointer 46 rotates therewith to show, on the dial 16, the amount of torque imposed on the analyzer 10.

As previously mentioned, the clutch and locking mechanism 24 is arranged so that even with the power tool removed, the pointer 48 remains in the maximum torque position until manually released by a release mechanism which is part of the clutch and locking mechanism 24.

In the past, damage sometime occurred to the analyzer 10 if a power tool was attached to the analyzer that had an output of greater torque than that capable of being recorded by the analyzer. In such instances, the torsion spring 36 would either break or become disengaged from the lugs as previously mentioned. When this occurred the analyzer 10 was no longer operable and could not be utilized until repairs were made. With the present frictional connection provided by the sleeve 44, the imposition of an overload torque will cause relative movement between the innermost coil 42 of the spring 36 and sleeve 44 and thus avoid breaking the spring 36. Since the measured torque is a function of the partial rotation of the torsion bar 54 in the housing 28, such slippage will not affect the calibration of the analyzer 10. The spring 36 will assume a slightly different position on the shaft 18, but due to the number of coils provided in the spring 36 and the fact that the torsion bar 54 actually determines the torque load, the calibration of the analyzer 10 will not be affected.

From the foregoing detailed description, it can be appreciated that the torque analyzer 10 constructed in accordance with the invention is much improved as compared to previously constructed torque analyzers. The frictional connection between the torsion spring and the torque input shaft obviates the necessity for heat treating or punching holes in the spring and further obviates the necessity for forming lugs on the shaft. The elimination of these problems improves the function of the analyzer apparatus as well as affording cost savings in manufacturing and maintenance of the torque analyzer.

The foregoing detailed description is provided by way of example only and it will be understood that many changes and modifications can be made thereto without departing from the spirit and scope of the invention.

The embodiments of the invention in which an exclusive property or privilege is claimed are defined as follows:

1. In torque analyzing apparatus including a housing, a torque receiving member having a relatively free end and having a fixed end connected to the housing, and torque indicating means responsive to movement of the free end of the torque receiving member to indicate the torque applied to the torque receiving member, the improvement comprising in combination:
   a torque input shaft rotatably supported in the housing;
   a spring housing connected to the torque receiving member and encompassing a portion of said shaft;
   spring means operably disposed between said shaft and spring housing for transmitting torque from said shaft to the torque receiving member through said spring housing; and
   intermediate connection means for frictionally connecting said shaft to said spring means.

2. In the apparatus of claim 1 wherein said spring means is a spiral spring disposed within said spring housing, said spring having an outermost end connected to said spring housing and an innermost coil frictionally engaging said connection means.

3. In the apparatus of claim 1 wherein said intermediate connection means includes a sleeve member of elastomeric material on said shaft.

4. In the apparatus of claim 3 wherein said elastomeric material is of about 70 durometer hardness.

5. In the apparatus of claim 4 wherein said spring means is a spiral spring disposed within said spring housing, said spring having an outermost end connected to said spring housing and an innermost coil of smaller unstressed diameter than the diameter of said sleeve member encircling said sleeve member for frictionally connecting said spring and shaft.

6. In the apparatus of claim 5 wherein said spiral spring has a width, as measured along the axis of said shaft, that is a multiple of the thickness of said spring.

* * * * *